May 26, 1964  H. G. McCARTY  3,134,609
MOWER HITCH
Filed Oct. 3, 1962  2 Sheets-Sheet 1

INVENTOR.
HORACE G. McCARTY
BY Walter V. Wright
AGENT

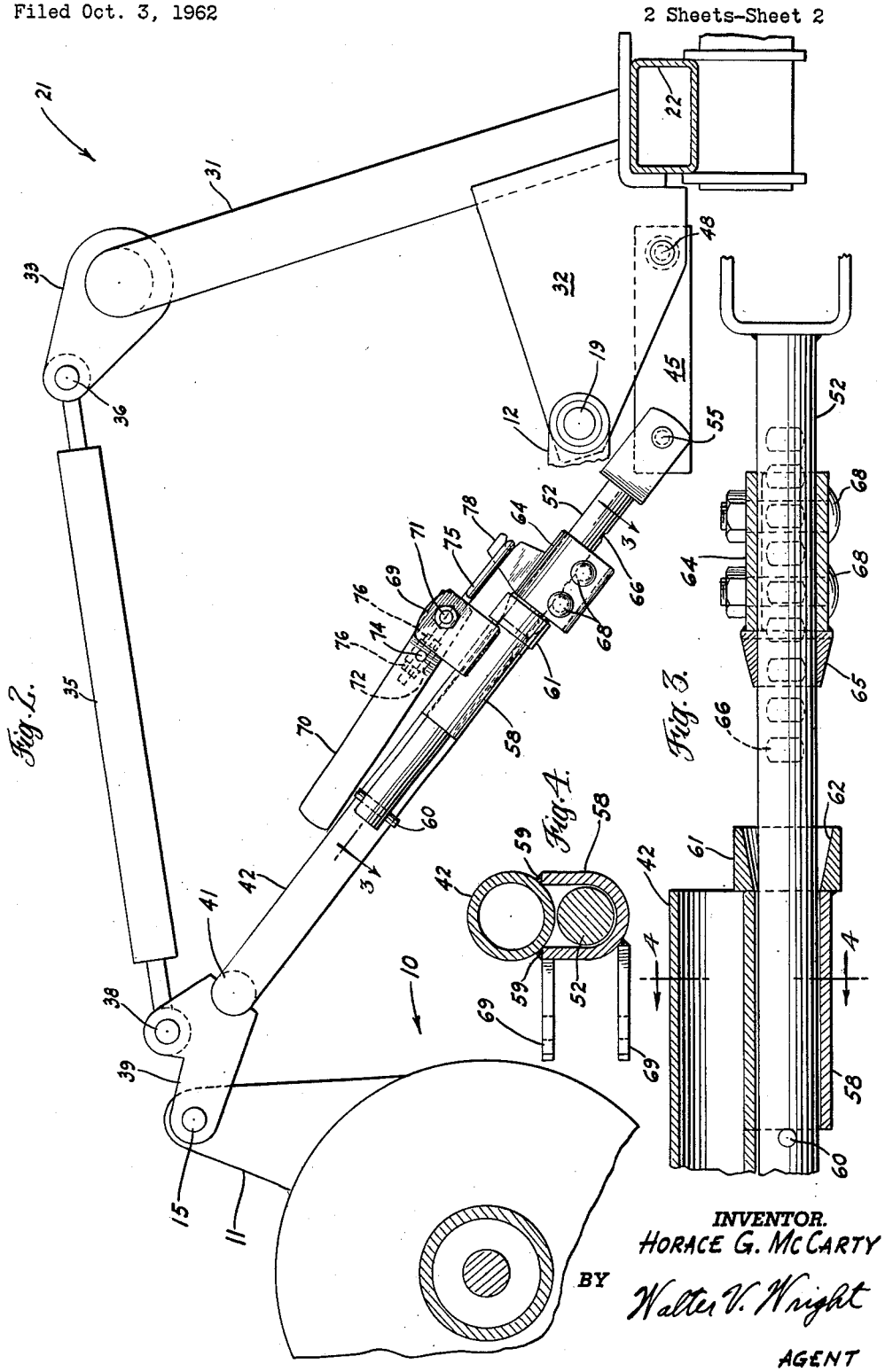

United States Patent Office 3,134,609
Patented May 26, 1964

3,134,609
MOWER HITCH
Horace G. McCarty, New Holland, Pa., assignor to Sperry Rand Corporation, New Holland, Pa., a corporation of Delaware
Filed Oct. 3, 1962, Ser. No. 228,159
8 Claims. (Cl. 280—478)

This invention relates to tractor mounted agricultural mowers. More specifically, it relates to apparatus to facilitate the aligning and connecting of a tractor mounted mower to a tractor equipped with a conventional three-point implement hitch.

The three-point implement hitch is well known in the agricultural machinery art as a means to fully mount an implement on a tractor. It comprises a pair of lower links, or drawbars, pivotally connected to and extending rearwardly from a tractor, and an upper rear hitch member on the tractor spaced above and between the drawbars. Power means, usually the tractor hydraulic system, is connected to the drawbars for raising and lowering them relative to the tractor. An implement, such as a mower, is attached directly to the two drawbars and to the tractor upper rear hitch member. Raising or lowering of the drawbars by the tractor hydraulic system effects raising or lowering of the implement relative to the ground. Connection of the implement to the upper rear hitch member serves to center the implement and stabilize it against tipping in the fore-and-aft direction.

All the three-point hitch connection points must allow vertical pivotal movement between the connected parts in order that the drawbars and implement may be raised and lowered. In order to facilitate the mounting of a variety of different implements on the tractor, the drawbars are usually connected to the tractor for at least limited lateral swinging movement relative thereto as well as vertical swinging movement.

In operation, a mower exerts considerable lateral force on the three-point hitch linkage. This lateral force is constantly changing in magnitude and direction as the field and crop conditions and the tractor speed and direction vary. The result is considerable undersirable side sway of the mower relative to the tractor when in operation. In the past, after the mower was mounted on the tractor, it was customary to attach braces from the tractor axles to the three-point hitch drawbars to help reduce this side sway. This solution is neither desirable, nor completely successful. More recently, a new type of three-point hitch mower mounting frame has been developed which eliminates the need for supplemental drawbar braces. The new type of three-point hitch mower mounting frame has a rigid inverted U-shaped stabilizer frame incorporated into the main mower mounting frame. The stabilizer frame connects directly to the tractor upper rear hitch member, and satisfactorily resists all relative motion between the mower mounting frame and the tractor except the necessary vertical pivotal motion. It is to mounted mowers of this type that the present invention relates. The rigidity of this type of mounting frame requires the establishment of close longitudinal and transverse alignment between the ampliment and tractor before connection of the mower to the upper rear hitch member of the tractor can be accomplished.

It is an object of this invention to provide apparatus to facilitate the mounting of a mower on a tractor having an upper rear hitch member.

It is another object of this invention to provide apparatus to simplify the centering, aligning and connecting of a mounted mower to a tractor on which the mower is to be mounted.

It is another object of this invention to provide apparatus to render the operation of aligning and mounting a mower on a tractor simply and easily accomplished under the most adverse mounting conditions.

It is another object of this invention to provide apparatus to simplify the centering, leveling, and aligning of a mower relative to a tractor on which the mower is to be mounted, said apparatus being readily adjustable to accommodate different sizes and makes of tractors.

It is another object of this invention to provide mower mounting apparatus having a universally movable portion which may readily be connected to a tractor without the necessity of first establishing close alignment between the tractor and mower, said apparatus including means to force the mower into exact alignment with the tractor after connection of the movable portion is established.

These and other objects and advantages of this invention will be apparent upon references to the following specification and claims taken in conjunction with the accompanying drawings wherein:

FIG. 2 is an enlarged fragmentary side elevational view of the tractor and mower mounting apparatus shown in FIG. 1;

FIG. 3 is an enlarged sectional view taken on the line 3—3 of FIG. 2; and

FIG. 4 is a sectional view taken on the line 4—4 of FIG. 3.

Figure 1:
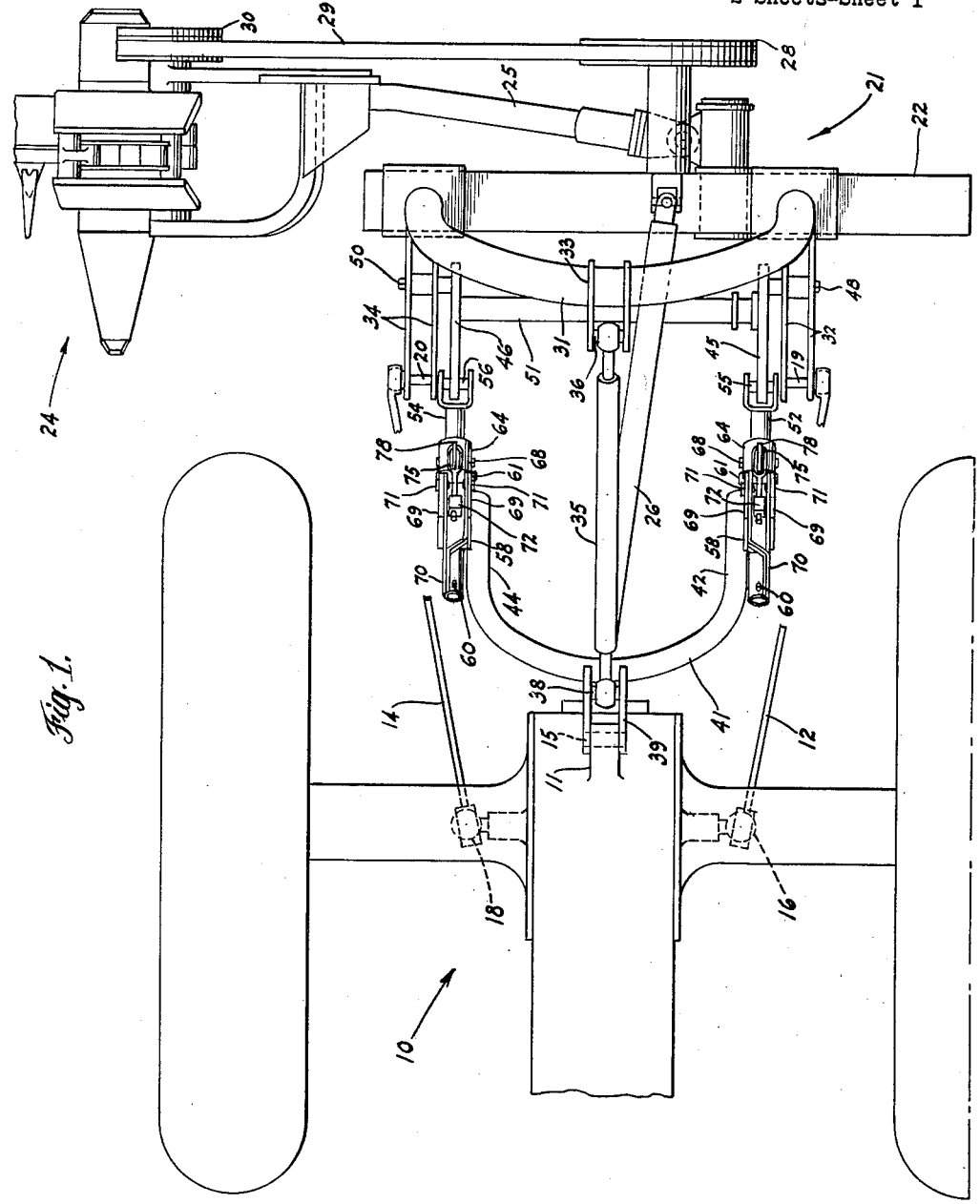
FIG. 1 is a fragmentary plan view of the rear portion of a tractor and a mounted mover embodying the aligning apparatus of this invention.

Referring now to the drawings in detail, in FIG. 1 the numeral 10, indicates the rear portion of a farm tractor equipped with a conventional three-point implement hitch. The three-point implement hitch comprises a centrally located rear hitch member 11, and a pair of drawbars 12 and 14. On the tractor shown, the rear hitch member 11 is in the form of a rigid stanchion which carries a removable horizontal connecting pin 15. The tractor rear hitch member 11 may be, and commonly is, in the form of a clevis instead of a stanchion. The forward ends of the drawbars 12 and 14 are connected to the tractor by ball joint connectors 16 and 18 for both lateral and vertical swinging movement relative to the tractor as is well known. The tractor and three-point hitch mechanism includes conventional means, not shown, for raising and lowering the drawbars about the connectors 16 and 18. Horizontal transversely extending connecting pins 19 and 20 are respectively carried by drawbars 12 and 14 at the rear ends of the drawbars. The connecting pins 19 and 20 have ball-type heads which permit limited swiveling movement of the pins relative to the drawbars.

The numeral 21 indicates, generally, a mower mounting structure having a transversely disposed main beam 22. A conventional agricultural mower 24 is connected to the frame beam 22 by a drag bar 25, as is well known in the art. The driving power for the mower is transmitted from the tractor power-take-off unit, not shown, through an extension shaft 26 (FIG. 1) to a drive pulley 28 carried on the mower mounting frame. From drive pulley 28, the mower driving power is transmitted through a V-belt 29 to a driven pulley 30 on the mower.

The rigid mower mounting frame 21 has an inverted U-shaped mast 31 extending upwardly and forwardly from main beam 22. At each side of the frame where the arms of mast 31 join main beam 22, a pair of plates 32 and 34, respectively, are rigidly attached to the arms of the mast and project forwardly therefrom. The forward ends of the pairs of plates 32 and 33 are provided with holes which constitute mounting sockets for the drawbar connecting pins 19 and 20. At the top, or bight, portion of the inverted U-shaped mast 31 is rigidly mounted a clevis 33. An upper, or stabilizer, link 35 has its rear end disposed between the arms of clevis 33 and connected thereto by a horizontal pivot pin 36. The upper link 35 is in the form of a turnbuckle. Rotation of the central portion of link 35 in one direction about its own longitudinal axis increases the length of the link, while rotation of the central portion of the link in the opposite direction decreases its length. The upper link 35, per se, is well known in the three-point implement hitch art. It is usually provided by the manufacturer of the tractor as a part of the three-point hitch linkage. The sockets at the ends of the link 35 which, respectively, receive pins 36 and 38 are of the ball-type which allow limited universal swiveling movement between the pins and the link. The forward end of upper link 35 is connected by a horizontal pivot pin 38 to a forwardly disposed clevis 39. Clevis 39 is pivotally connected to the tractor upper rear hitch member by the removable connecting pin 15. For tractors having a clevis-type of rear hitch member 11, the implement clevis 39 may preferably be made in the form of a fork having a central forwardly extending arm which would lie between the arms of the tractor upper rear hitch clevis and receive the connecting pin 15.

The clevis 39 is rigidly carried by the bight portion of an inverted U-shaped frame member 41 having downwardly and rearwardly extending left and right arms 42 and 44. The member 41 is a part of the mower mounting apparatus. The remainder of the stabilizer frame comprises a pair of arms 45 and 46 having their rear ends pivotally anchored, respectively, on main frame plates 32 and 34 by horizontal pivot members 48 and 50. The arms 45 and 46 extend forwardly from pivot members 48 and 50. A rigid transverse frame member 51 extends between the arms 45 and 46 and has its ends rigidly connected thereto, as by welding. A second pair of arms 52 and 54 are pivotally connected, respectively, to arms 45 and 46 by horizontal pivot members 55 and 56.

All the pivot pins 48, 50, 55 and 56 are on horizontal axes. Thus, the arms 52 and 54 are limited solely to vertical pivotal movement relative to the main mower mounting frame 21.

The arms 52 and 54 extend forwardly parallel to arms 42 and 44 of the U-shaped stabilizer member 41. Each of the arms 42 and 44 of the U-shaped member 41 has a sleeve member 58 welded thereto, as may be seen in FIG. 4 at 59. The axes of the respective sleeve members are parallel to the axes of arms 42 and 44. The arms 52 and 54 extend through the sleeve members 58. In this manner, the U-shaped stabilizer member 41 is carried by the stabilizer arms 52 and 54 which are pivotally connected to the main frame. As seen in FIGS. 3 and 4, the arm 52 (and 54) fits loosely within sleeve 58. With this arrangement, when the clevis 39 is disconnected from the upper rear hitch member 11 of the tractor, the U-shaped stabilizer member 41 is freely movable to a limited extent in all directions relative to arms 52 and 54. The upper link 35 has universally movable ball-type sockets for the connecting pins 36 and 38 and it is extendable and retractable in length as mentioned above; consequently, it does not prohibit universal movement of the U-shaped member 41 in sleeves 58. A pin 60 extending through the forward end of each arm 52 and 54 prevents the U-shaped member 41 from being pulled completely off the arms 52 and 54.

The rearmost end of each sleeve 58 carries a female socket member 61 having an inner frustroconical cam surface 62 (FIG. 3). The axis of each cam 62 is parallel to the arm 42 or 44 of the U-shaped member 41 on which it is mounted. Each of the second pair of arms 52 and 54 carries a male socket member 64 having an outer frustroconical cam surface 65 at the forward end thereof (FIG. 3). The male socket members 64 are in the form of sleeves and are slidably received over the respective arms 52 and 54. The axis of the outer frustroconical cam surface 65 of each member 64 is co-axial with the longitudinal axis of the arm 52, or 54, on which it is carried.

The male socket members 64 are adjustable along the length of the arms 52 and 54. On the underside of each arm 52 and 54 a plurality of notches, or grooves, 66 are provided. They extend transversely to the axes of the arms 52 and 54 as best seen in FIGS. 2 and 3. A pair of studs 68 is carried by each male socket member 64. Each stud lies in one of the notches 66 in the arms 52 and 54. This locks the male socket to its arm 52 or 54. To adjust the position of the socket members 64 on arms 52 and 54, the studs 68 are first removed, then the socket member is slid along its arm 52 or 54, and finally the studs 68 are replaced in the socket members and in a different notch 66. This adjustment enables the apparatus to adapt to different tractors. It may be necessary to vary the length of the turnbuckle-type upper link 35 also. This is simply accomplished as described above.

When the mower mounting apparatus is properly aligned and mounted on a tractor, the outer cam surfaces 65 are seated within the inner cam surfaces 62 as seen in FIGS. 1 and 2. When the cam surfaces are so seated, the arms 42 and 52 are parallel and the arms 44 and 54 are parallel.

On the upper surface of each of the aforementioned sleeves 58 is welded a pair of lugs 69 (see FIG. 4). A lever 70 having a bifurcated fulcrum end is pivotally mounted on each pair of lugs 69 by a pair of short studs 71. As best seen in FIG. 2, a sleeve 72 is pivotally carried between the bifurcations of each lever 70 by co-axial pivot pins 74 mounted, respectively, in the arms of each bifurcated lever 70. A link 75, having an eyelet at its rearmost end, is carried by each sleeve 72. A portion of link 75 adjacent the forward end thereof is threaded and carries a pair of jam nuts 76 which engage the ends of the sleeve 72 to adjustably anchor the link on the lever. An upstanding hook, or lever engageable member, 78 is provided on each male socket member 64.

It will be apparent from FIG. 2 that when the lever 70 is manually pivoted clockwise about studs 71, the link 75 will be released from hook 78 and moved to the right by a considerable amount. In moving the lever from this release position back to the latched position shown in FIG. 2, the mechanical advantage will be readily apparent. It should also be noted that in the position shown in FIG. 2, the pivotal mounting pins 74 of link 75 are in an "over center" or locked position relative to the pivot studs 71 about which the lever swings.

The apparatus is adjusted for a given tractor by first positioning the male socket member 64 at the approximate proper position on the arms 52 and 54. Final exact adjustment is provided by the jam nuts 76 and sleeves 72 which mount links 75 on levers 70. The mechanism is adjusted so that when the parts are in the position shown in FIGS. 1 and 2, the exterior cam surfaces 65 of the male socket members 64 are tightly engaged with the internal cam surfaces 62 of the female socket members 61.

With the apparatus described above, to mount the mower on the tractor it is only necessary that the tractor be positioned approximately in connecting relation to the implement. Neither transverse nor longitudinal alignment between the implement and tractor is critical.

With the levers 70 released from hooks 78, the U-shaped member 41 is manually moved into exact coupling engagement with the tractor upper rear hitch member 11 and connecting pin 15 is inserted. The links 75 of levers 70 are then engaged with hooks 78 of the male socket members and the levers are moved to the position shown in FIG. 2. When this is done, the arms 52 and 54 are pulled toward the tractor and the cam surfaces 65 engage sockets 61. This forces the arms 52 and 54 into parallel relation with the arms 42 and 44 of member 41, thus moving the implement into exact operating alignment with the tractor.

The rigidity of the general type of mower mounting frame shown herein is such that, in the absence of the connection aiding mechanism of this invention, the tractor must be backed up to the implement and stopped with the tractor upper rear hitch member in virtually exact transverse and fore-and-aft alignment with the implement upper hitch member before the connecting pin (such as the one shown at 15 herein) can be inserted. Even then, if the ground is not level, the mower may be canted relative to the tractor and the pin 15 will not enter both the clevis and the tractor rear hitch member until one end of the mower is elevated to make it level with the tractor. This is quite an operation, since the combined weight of the mower and mounting frame is in the neighborhood of five hundred pounds.

Since the drawbars and the connecting pins carried thereby are universally movable, at least to a limited degree, it is not difficult to connect the drawbars to the implement mounting frame even when the implement and tractor are not in exact alignment. However, connection of the drawbars to the implement neither appreciably helps nor hinders the connection of the upper hitch member. It will be seen from the above that this invention eliminates the alignment problems normally associated with connecting the upper implement hitch member to the upper rear hitch member of the tractor.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as they fall within the scope of the invention or the limits of the appended claims.

Having thus described my invention, what I claim is:

1. Apparatus for aligning an implement with a tractor upon which the implement is to be mounted and wherein the tractor has a rear hitch member fixedly mounted thereon, said apparatus comprising, a rigid member having a first pair of arms interconnected by a bight portion, a hitch member carried by the bight portion of said rigid member and being connectable with the fixed rear hitch member of the tractor to lock said rigid member in a predetermined proper operating alignment on said tractor hitch member, a rigid frame upon which said implement is carried, a second pair of arms mounted on said frame, said second pair of arms extending forwardly from said frame and being parallel to said first pair of arms when the rigid member is connected to said tractor hitch member and the frame is in proper operating alignment with the tractor, means normally loosely connecting said first pair of arms to said second pair of arms for limited free movement relative thereto in a plurality of directions to facilitate movement of said rigid member into hitching engagemnet with said tractor hitch member even while said frame and said second pair of arms are not in exact operating alignment with said tractor rear hitch member, and means incorporated in said connecting means and selectively operable, after connecting of said rigid member to said tractor hitch member, to force said second pair of arms into rigid parallel relationship with said first pair of arms thereby forcing said frame into proper operating alignment relative to said tractor rear hitch member.

2. Apparatus for aligning an implement with a tractor upon which the implement is to be mounted and wherein the tractor has a rear hitch member fixedly mounted thereon, said apparatus comprising, a rigid member having a first pair of arms interconnected by a bight portion, a hitch member carried by the bight portion of said rigid member and being connectable with the fixed rear hitch member of the tractor to lock said rigid member in a predetermined proper operating alignment on said tractor hitch member, a rigid frame upon which said implement is carried, a second pair of arms mounted on said frame, said second pair of arms extending forwardly from said frame and being parallel to said first pair of arms when the rigid member is connected to said tractor hitch member and the frame is in proper operating alignment with the tractor, means normally loosely connecting said first pair of arms to said second pair of arms for limited free movement relative thereto in a plurality of directions to facilitate movement of said rigid member into hitching engagement with said tractor hitch member even while said frame and said second pair of arms are not in exact operating alignment with said tractor rear hitch member, lever and lever engageable means on said first and second pairs of arms operable, after connection of said rigid member to said tractor hitch member, to force said second pair of arms to move toward said tractor, interengageable cam and cam engageable means on said first and second pairs of arms operable, after connection of said rigid member to said tractor hitch member and upon movement of said second pair of arms toward said tractor, to engage each other and force said second pair of arms into rigid parallel relationship with said first pair of arms thereby forcing said frame into proper operating alignment relative to said tractor hitch member, said lever means being movable to a locking position after said second pair of arms are in parallel relationship with said first pair of arms to lock said frame in proper operating alignment relative to said tractor hitch member.

3. Apparatus for aligning a mower with a tractor upon which the mower is to be mounted and wherein the tractor has a rear hitch member fixedly mounted thereon, said apparatus comprising a rigid generally U-shaped member having a first pair of arms interconnected by a bight portion, a hitch member rigidly mounted on the bight portion of said generally U-shaped member and being connectable to the fixed rear hitch member of the tractor to lock said generally U-shaped member in a predetermined proper operating alignment on said tractor hitch member, said first pair of arms extending generally rearwardly from the tractor when the U-shaped member is in proper operating alignment, a rigid frame upon which said mower is carried, a second pair of arms mounted on said frame for pivotal movement relative thereto, said second pair of arms extending forwardly from said frame and being parallel to said first pair of arms when the rigid U-shaped member is connected to said tractor hitch member and the frame is in proper operating alignment with the tractor, sleeve members mounted on the arms of one of said pairs of arms and loosely receiving the arms of the other of said pairs of arms thereby loosely connecting said first pair of arms to said second pair of arms for movement relative thereto in a plurality of directions to facilitate movement of said generally U-shaped member into hitching engagement with said tractor hitch member, coacting lever and lever engageable means on said first and second pairs of arms operable, after connection of said rigid U-shaped member to said tractor hitch member, to force said second pair of arms to move toward said tractor, socket means on said first pair of arms having first cam surfaces thereon, socket means on said second pair of arms having second cam surfaces thereon engageable with said first cam surfaces after connection of said rigid U-shaped member to said tractor hitch member and upon movement of said second pair of arms toward said tractor to force said second pair of arms into parallel relationship with said first pair of arms thereby forcing said frame into proper operating alignment relative to said tractor hitch member.

4. Apparatus for aligning a mower with a tractor as recited in claim 3 wherein said sleeve members are two in number, each of said sleeve members having an elongated bore, one of said sleeve members being mounted on each of the arms of said first pair of arms with the axis of said bore extending parallel to the arm on which it is mounted, said socket means on said first pair of arms comprising a pair of female socket members each having an inner frustroconical cam surface, one of said female socket members being provided on each of said sleeve members with the axis of said inner frustroconical cam surface coaxial with the axis of the bore of the sleeve on which it is provided, said socket means on said second pair of arms comprising a pair of male socket members each having an outer frustroconical cam surface, one of said male socket members being mounted on each of the arms of said second pair of arms with the axis of said outer frustroconical cam surface coaxial with the axis of the arm on which it is mounted.

5. Apparatus for aligning a mower with a tractor as recited in claim 4 wherein said male socket members are mounted on the arms of said second pair of arms for movement axially along the length of the arms to adjust the apparatus for use with different sizes and makes of tractors, and means on said male socket members for locking the male socket members rigidly to the arms on which they are mounted in a predetermined proper position for a given tractor.

6. Apparatus for aligning a mower with a tractor as recited in claim 4 wherein said lever means comprises a pair of levers, one pivotally mounted on each of said sleeve members for pivotal movement toward and away from said tractor when said rigid U-shaped member is connected to the tractor, a pair of links, each of said links having an eyelet at one end thereof, means pivotally connecting the other ends of said links respectively to said levers, said lever engageable means comprising a pair of hook-like members, one of said hook-like members being rigidly mounted on each of said male socket members, said eyelets receiving said hook-like members therein when said levers are pivoted away from said tractor and pulling said hook-like members, and thereby said second pair of arms, toward said tractor upon movement of said levers toward said tractor.

7. Apparatus for aligning a mower with a tractor as recited in claim 6 wherein said means pivotally connecting said links to said levers is adjustable to selectively vary the distance from the eyelets of the links to the means connecting the links to the levers.

8. Apparatus for aligning a mower with a tractor as recited in claim 6 wherein said levers are pivotally mounted on said sleeves for movement in one direction from a first position away from said tractor to a dead center position toward said tractor wherein the hook-like members, the pivotal axes of said levers and the means pivotally connecting said links to said levers all line in a straight line and in which position said male and female socket members are fully engaged, said levers being movable in said one direction to an over-center position toward said tractor to hold said socket members locked in engagement.

References Cited in the file of this patent

UNITED STATES PATENTS

| 1,902,212 | Bonge | Mar. 21, 1933 |
| 2,454,697 | Hilblom | Nov. 23, 1948 |
| 2,733,935 | Whiteley | Feb. 7, 1956 |
| 2,779,260 | Orelind et al. | Jan. 29, 1957 |
| 2,798,740 | Montguire | July 9, 1957 |

FOREIGN PATENTS

| 1,190,502 | France | Apr. 6, 1959 |